United States Patent Office 3,463,690
Patented Aug. 26, 1969

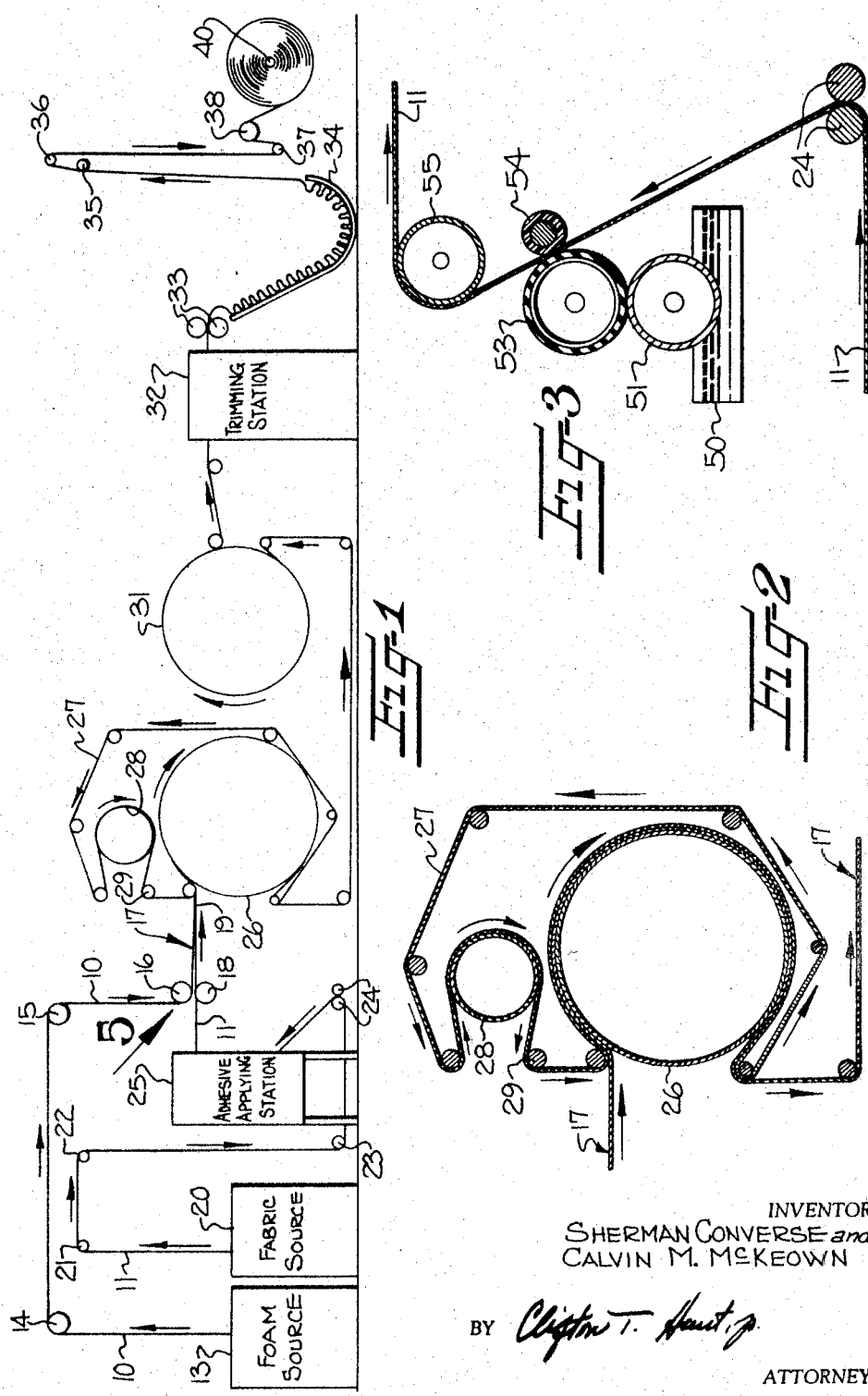

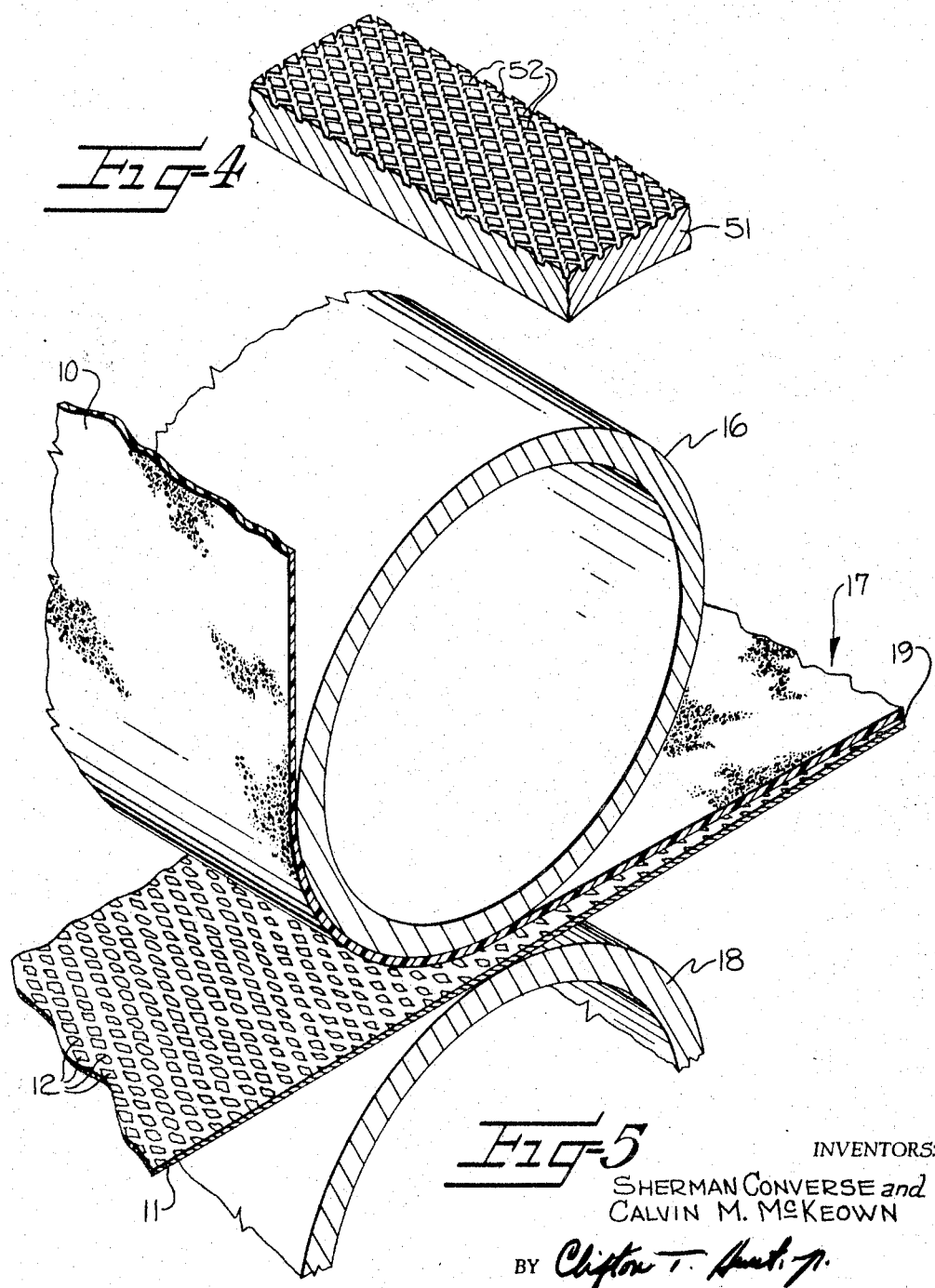

3,463,690
METHOD OF LAMINATING POLYURETHANE FOAM AND FABRIC
Sherman Converse and Calvin M. McKeown, Aiken, S.C., assignors to Graniteville Company, Graniteville, S.C., a corporation of South Carolina
Continuation of abandoned application Ser. No. 112,493, June 5, 1961. This application Feb. 3, 1967, Ser. No. 613,820
Int. Cl. B32b 7/12; C09j 5/06
U.S. Cl. 156—291                2 Claims

ABSTRACT OF THE DISCLOSURE

This invention relates to foam-fabric laminates and more particularly to a laminate formed from a cellular web such as polyurethane foam and a textile fabric web, and to its method of manufacture.

CROSS-REFERENCES TO RELATED APPLICATIONS

This application is continuation of applicant's copending application 112,493, filed June 5, 1961, now abandoned.

Laminated polyurethane foam and fabric have previously been known as shown by U.S. Patent No. 2,957,793 issued Oct. 25, 1960 to Curtiss-Wright Corporation upon application of John W. Dickey and entitled Method of Laminating Polyurethane Foam. As indicated therein, laminated foam fabric, wherein the foam is polyurethane foam has been found useful in the manufacture of garmets with the foam serving as an insulating liner and the fabric layer serving as a skin or wearing surface which protects the more fragile foam. The fabric layer of the laminate is preferably one suitable for the outer surface of garments and may be either woven or knit of wool, cotton, synthetics or any desired combination thereof. Although the laminate of the present invention is at present finding its principal utility in garments, it should be understood that the laminate has many other uses which include upholstering material, the packaging of fragile articles, wherein the fabric may be comparatively inexpensive, and the making of table cloths wherein the fabric may be of the open-weave transparent type with the foam serving as a heat insulator to protect the surface of the table from hot dishes.

In order to serve properly as a garment material, it is highly desirable, if not essential, that the laminated foam fabric have sufficient porosity to permit "breathing," be able to withstand repeated dry cleanings and/or washings, depending upon the fabric to which the foam is laminated, and that it be flexible or pliable with a soft hand and minimum bulk.

The polyurethane foam which forms one component of the laminate is of cellular and porous structure and will therefore "breathe." The foam also has a soft hand, is flexible or pliable and the bulk can be varied by selection of foam in a desired thickness. Also, the foam will withstand repeated dry cleanings and/or washings.

It is well known that laminates having the foregoing properties desirable in garments are readily available, but as indicated in the said Dickey patent, difficulty has been experienced in providing a suitable bonding agent for securing the polyurethane foam to the fabric, which bonding agent will adhere the foam and fabric together with adequate adhesive fastness without adversely affecting their desirable properties. Specifically, the bonding agent must be able to withstand repeated dry cleanings and/or washings without deterioration or delamination of the foam and the fabric. Also, the bonding agent must not seal off the passage of air through the foam and fabric or stop it from "breathing." Additionally, the bonding agent must be capable of economic application to continuous webs of foam and fabric, and must not adversely affect the soft hand, flexibility or light bulk of the foam and fabric layers.

Dickey's solution to the problem is to fuse the polyurethane foam to the fabric by heating one surface of the foam sufficiently to transform it to a tacky state and thereafter press the fabric onto the soft tacky surface of the heated foam when said heated surface has cooled sufficiently to avoid scorching of the fabric. Thus, in effect, Dickey utilizes at least the surface portion of the polyurethane foam component of the laminate as an adhesive to bond the fabric to the polyurethane foam sheet. While such a laminate successfully withstands repeated dry cleanings and/or washings, it has certain disadvantages from both economical and practical considerations in that the polyurethane foam is a comparatively expensive adhesive and in that extreme care must be exercised from a safety standpoint because of the open flame customarily employed in fusing the foam. Care must also be taken to keep the fused foam from adversely affecting the soft hand and porosity of the fabric and unfused foam.

The thickness of the foam sheets in laminates used for garments generally ranges between $\frac{1}{16}$ and $\frac{3}{32}$ of an inch so as to attain maximum flexibility in the laminate commensurate with the desired amount of bulk and insulation provided by the polyurethane foam component. In the fusing or welding method of Dickey, about $\frac{1}{64}$ of an inch or from about 17 to 25 percent of the foam component is melted or fused to provide the adhesive. Thus, in Dickey, it is necessary to start with a foam component having a thickness of $\frac{3}{32}$ of an inch if it is desired to have a final foam thickness of approximately $\frac{5}{64}$ of an inch.

Another economic consideration in the fusing method of Dickey is that care must be taken to provide foam of maximum uniformity because the irregular surface inherent in polyurethane foam often results in the portions of the surface remote from the heating means receiving insufficient heat to fuse such remote portions to a tacky liquid consistency and consequently resulting in an imperfect bond to the fabric at such points or to streaking and discoloration of the fabric, or both.

Still another disadvantage of the fusing method disclosed and claimed in Dickey is the safety hazard created by the need for an open flame or other type of high heat source for fusing the foam. The need for adequate safeguards to protect personnel and the fabric, which necessarily must pass in close proximity to the flame, is apparent. Such safeguards are not needed in practicing the present invention.

Additionally, in the fusing method of Dickey, care must be taken to fuse the foam in such a manner as to avoid applying its tacky surface to the fabric in a continuous film. Use of a substantially continuous film of adhesive, whether formed by heating the foam or otherwise, to bond the foam to the fabric is objectionable in that it stiffens the laminate and adversely affects its "breathing" qualities. Such stiffening and sealing of the laminate may render it undesirable for use in garments.

It is therefore an object of this invention to provide a method of bonding together continuous sheets of polyurethane foam and fabric with an independent adhesive layer to thereby provide a laminated foam fabric which will overcome the foregoing difficulties in that it may be economically and safely laminated in continuous webs, is capable of withstanding repeated dry cleanings and washings, is soft, flexible and porous and is therefor suitable for garments, among other uses.

Several adhesives comprising water dispersions of acrylic polymers have been found satisfactory for use in the present invention. Also, various other types of adhesives have been found satisfactory, including vinyl polyurethane and various synthetic rubbers. The important properties of the adhesive are that it be of reasonable cost from an economic consideration, that it have adequate fastness in that no delamination will occur in washing or dry cleaning, and it must be flexible so that it will readily bend and fold without delamination. Another important property of the adhesive is that it have good "hold-out," that is, a minimum tendency to penetrate into the fabric. Still another important property of the adhesive is its ability to form a satisfactory bond without the necessity of high heat, which might scorch the fabric or create a safety hazard, or of high pressures which would face the adhesive into the foam and fabric and possibly collapse the foam. Undue penetration of the adhesive into the foam or fabric creates a danger of stiffening the laminate or destroying its porosity and "breathing" qualities. Also, the adhesive must be as elastic as the fabric or foam component of the laminate, and it should be impervious to mold and/or insect attack. A highly viscous adhesive has been found desirable in that high viscosity tends to eliminate undue penetration into the fabric. The requisite viscosity may be obtained by the addition of a suitable thickening agent to the adhesive.

Some of the objects of the invention having been stated, other objects will appear as the description proceeds when taken in connection with the accompanying drawings, in which:

FIGURE 1 is a schematic side elevation of the apparatus utilized in laminating polyurethane foam to fabric according to the present invention;

FIGURE 2 is an enlarged view of the drying drum showing the manner in which the laminated foam fabric is passed therearound and held thereagainst under light pressure by the blanket;

FIGURE 3 is a sectional view of a kiss roll arrangement employed for applying adhesive to the fabric;

FIGURE 4 is an enlarged fragmentary view of the etched or knurled roll showing the surface configuration thereof; and FIGURE 5 is an enlarged view looking in the direction of the arrow 5 in FIGURE 1.

The illustrative embodiment of the laminate shown in the drawings comprises three component layers, namely, a porous and cellular layer 10 of polyurethane foam plastic material, a layer 11 of porous fabric which may be woven or knit as desired, and thin intermittent and independent layer 12 of adhesive. The adhesive 12 is a synthetic substance formed from an aqueous dispersion or solvent solution of synthetic condensation and addition-type polymers such as acrylic polymers, vinyl copolymers, polyurethanes and butadiene acrylonitrile synthetic rubbers which are water insoluble and insoluble in organic dry cleaning solvents.

Water dispersions of acrylic polymers have been found to provide particularly suitable adhesives for laminates intended for use in graments. Specific examples are as follows:

EXAMPLE I

|  | Parts by weight |
|---|---|
| Rhoplex B-15[1] (46% solids) | 400 |
| Methyl cellulose, 4000 cps.—5% solution | 85 |

[1] Rhoplex B-15 is a product of Rohm & Haas Company, Washington Square, Philadelphia 5, Pa., and is described in that company's Technical Bulletin No. T-36b, as revised October 1957, as an acrylic polymer in emulsion form developed as a bonding and finishing agent for textiles. It is further characterized by imparting an extremely soft, transparent film when dried on fabrics and by its stability and excellent economy. Some of its physical properties are as follows:

Appearance.—Milky liquid, low viscosity.
Solids content.—46%.
pH.—6.0 to 6.5.
Particle size.—Less than one micron.
Colloidal charge.—Non-Ionic.
Solubility.—Dispersible in water in all proportions; can be rendered more viscous by raising pH to 8.0 with any dilute alkali.

Some of its other characteristics which make it suitable for an adhesive in a foam fabric laminate are its good mechanical stability, excellent chemical stability, its outstanding bath compatibility with other ingredients, due to non-ionic nature, and its excellent bonding characteristics which provide adequate adhesion with a small amount of applied solids which eliminates the need for a thick layer of adhesive.

The methyl cellulose is added to the above acrylic resin using a high speed stirrer and is stirred in continuously until smooth. For roller applications, the mix should have a viscosity at 10 r.p.m. of approximately 25,000 cps. as measured by a Brookfield viscometer, a product of Brookfield Engineering Laboratories, Inc. of Stoughton, Mass. Additional methyl cellulose may be added to increase the viscosity if necessary. It is important that the mix be of proper viscosity in order to prevent undue penetration of adhesive into the fabric or foam. The foregoing adhesive has been found useful in laminating polyurethane foam to fabrics formed from fibers which will stand a fairly high curing temperature in the range of 375° to 425° F., such as cotton, viscose, cuprammonium, rayon, wool and silk. The adhesive requires curing at a temperature of 375° F. for a minimum of 20 seconds in order to obtain satisfactory fastness to laundering and dry cleaning.

EXAMPLE II

|  | Parts by weight |
|---|---|
| Rhoplex HA-8[2] (46% solids) | 300 |
| Ammonium chloride | 1¼ |
| Methyl cellulose 400 (dry) | 2¾ |

[2] Rhoplex HA-8 is a product of Rohm & Haas Company, Washington Square, Philadelphia 5, Pa., and is described in their Technical Bulletin No. T-49 of September 1960 as a self-cross-linking acrylic polymer having adhesive properties durable to washing and dry cleaning. It provides good adhesion to synthetic and cellulosic fibers. Webs bonded with this polymer exhibit excellent resistance to stiffening on exposure to heat and ultra-violet. It cures at relatively low temperatures. The physical properties are:

Solids content.—46% ±0.5%.
Ionic property.—Non-ionic emulsion.
pH.—2.8.
Specific gravity.—1.05.
Appearance.—Milky liquid, low viscosity.
Storage.—Stable under normal conditions, protect from freezing.

The ammonium chloride is dissolved in a minimum amount of warm water and then added to the above acrylic resin, after which the methyl cellulose is sprinkled into the mix using a high speed stirrer. Stirring is continued until the mix is smooth.

For roller application, the adhesive should have a Brookfield viscosity at 10 r.p.m. of 30,000 cps. This formulation is useful for laminating foam to fabrics made from various synthetic fibers such as nylon, acetate, rayon, acrylic, vinyl or polyester fibers, which should not be subjected to a curing temperature of over 300° F. because of their tendency to shrink or soften with heat. Foam fabric laminates utilizing an adhesive made by the above formulation require curing for a minimum of 40 seconds at 300° F. in order to obtain satisfactory fastness to laundering and dry cleaning. The instant formulation cures more rapidly at 300° F. than the formulation of Example I which is the reason for its preference when working with synthetic fibers or other fibers which cannot be safely subjected to heat in excess of 300° F.

EXAMPLE III

|  | Parts by weight |
|---|---|
| Rhoplex HA-8[3] (46% solids) | 300 |
| Rhonite 401[4] | 75 |
| Ammonium chloride | 1⅓ |
| Methyl cellulose 4000 (dry) | 2¾ |

[3] See description of Rhoplex HA-8 given in connection with Example II.

[4] Rhonite 401 is a product of Rohm & Haas Company, Washington Square, Philadelphia 5, Pa., and is described in their Technical Bulletin No. T-57 of September 1960 as a new type of thermosetting resin which serves as a crosslinking agent for numerous acrylic polymers, nitrile rubbers, vinyl polymers, etc. It imparts increased durability through this crosslinking mechanism with a minimum in hand build-up. Rhonite 401 is characterized by the following properties:

Appearance.—Clear solution.
Active ingredient.—55% (in xylol).
pH.—Approximately 7.0.
Solubility.—Readily emulsified at working concentrations.

The Rhonite 401 is added to the Rhoplex HA-8. The ammonium chloride is dissolved in a minimum amount of water and added to the foregoing. The methyl cellulose is then sprinkled into the mix using a high speed stirrer and stirring is continued until the mix is smooth.

This formulation is used where better wet adhesion is desired than can be obtained with the formulations of Examples I or II. Also, the instant formulation will have less thermoplasticity than the formulations of Examples I or II due to the presence in the instant formulation of the thermosetting resin Rhonite 401. The viscosity, curing time and temperature for the instant formulation requirements are substantially the same as for the formulation of Example II.

In each of the foregoing examples and as a general rule in the application of any suitable adhesive, the optimum dry add-on of the adhesive is from ⅓ to ½ ounce per square yard, depending on the type of fabric employed in the laminate. In general, light, smooth-textured fabrics require less adhesive, while the heavy, rough-textured fabrics require more adhesive.

Control of the viscosity of the adhesive has been found necessary to prevent excessive penetration of the adhesive into the foam and/or fabric. Excessive penetration caused by the adhesive being of too low a viscosity or too thin will result in decreased flexibility, decreased porosity and waste of adhesive, as well as, in the case of thin open weave transparent fabrics, a poor appearance due to the adhesive showing through on the face. In this connection, it has been found that the adhesive of Examples II and III tend to penetrate a little more than the adhesive of Example I, and it is for this reason that a higher viscosity is recommended for the adhesive of Examples II and III.

Referring again to the drawings, the polyurethane foam 10 is in continuous sheet form and is delivered from a foam source such as a roll 13 across guide rolls 14 and 15 to a roll 16 preparatory to joining with the fabric 11 and the adhesive 12 thereon to define a foam fabric laminate 17.

Like the foam 10, the fabric 11 is likewise in continuous sheet form and may be delivered from a suitable fabric source such as a roll 20, from which it is led over guide rolls 21, 22 and 23, through a nip roll 24 which helps regulate tension on the fabric, beneath an adhesive applying station schematically illustrated at 25, and thence to the adhesive applying station 25 at which point the adhesive 12 is applied to one surface of the fabric 11.

The adhesive 12 may be applied to the fabric by roller application, or in the case of thin, open weave, transparent fabrics it has been found preferable to utilize a spray application of the adhesive to the fabric in order to avoid strike through of the adhesive. Roller application, utilizing a kiss roll arrangement for applying the adhesive, has been found satisfactory for most laminates intended for garments. Such an arrangement includes a container 50 for the adhesive 12 and an etched roll 51 having knurled diamond-like portions 52 turning in the adhesive and which transfer a measured amount of highly viscous adhesive 12 to a rubber roll 53 on top of the etched roll 51 and rotating in engagement therewith. The fabric 11, after passing under the adhesive applying station 25 and through nip roll 24, is brought between a foam covered roll 54 and the rubber roll 53, whereby adhesive on the roll 53 is transferred to one surface of the fabric in a predetermined pattern defining spaced areas of adhesive generally in accordance with the configuration of the knurled portions 52 on the etched roll (FIGURE 4). Spot application of the adhesive helps preserve the porosity and soft hand of the foam and fabric components of the laminate. The fabric 11 then passes to a guide roll 55 from whence it is guided toward engagement with the foam 10.

The etched roll 51 and the rubber roll 53 both turn at the same speed which is synchronized with the speed of the cloth to control the amount of adhesive applied to the fabric 11. The rolls 51 and 53 may turn at the same speed as that of the cloth or fabric 11, in which event a minimum amount of adhesive is applied to the fabric in a spaced pattern generally similar to the knurled pattern 52 on the etched roll 51. If it is desired to apply more adhesive, generally determined by the characteristics of the particular fabric desired in the laminate, the speed of the rolls 51 and 53 may be increased, generally up to 25% faster than the speed of the fabric. Increasing the speed of rolls 51 and 53 relative to the speed of the fabric 11 will tend to smear the adhesive pattern but will not destroy its spaced dispersion on the fabric.

It will be noted that the adhesive 12 is applied to the upper surface of the cloth 11 as it leaves the adhesive applying station 25 and that the foam 10 is fed under the roll 16, after which it joins with the adhesive layer 12 and the fabric 11. The fabric 11 passes from the adhesive applying station 25 to a supporting guide roll 18 spaced beneath the roll 16 a distance slightly greater than the thickness of the laminate to be formed. Such a spacing is for the purpose of avoiding application of pressure to the laminate at this critical stage in its formation while at the same time bringing the foam component 10 and the fabric component 11 into close proximity preparatory to delivering them under controlled light pressure to a drying cylinder 26.

The adhesive applying station 25 is spaced from the roll 18 a critical distance taking into consideration the speed of travel of the cloth 11 as it leaves the station 25. This critical distance is provided for the purpose of enabling a sufficient elapse of time from the application of the adhesive 12 to the fabric 11 to permit just enough evaporation of water or other vehicle from the deposited adhesive to form a thin skin or film on the surface of the adhesive before it contacts the cellular foam 10. This thin film on the surface of the adhesive layer 12 resists penetration of the adhesive into the fragile cellular foam during initial contact and before the adhesive has been cured in subsequent processing.

The length of time it takes the fabric to pass between the adhesive station 25 and the roll 18 is a further measure to guard against excessive penetration of the adhesive, a time interval of approximately ten seconds being generally sufficient at room temperature to form the desired film on the surface of the adhesive.

The foam 10 and fabric 11 with the adhesive 12 thereon come together, as indicated at 19 in FIGURE 5, just after they pass under and over their respective closely spaced rolls 16 and 18 and prior to their delivery to a drying cylinder 26. The laminate components are not subjected to any pressure prior to their delivery to the drying cylinder and it is important that pressure on the laminate be kept to a minimum until the adhesive has dried. Otherwise, the adhesive will be forced into the fragile foam and fabric to an undesirable extent.

It is also important that the foam and fabric be kept under minimum tension throughout its processing. Undue stretching of the fabric increases its potential shrinkage and consequent wrinkling or puckering of the laminate during subsequent laundering and dry cleaning. The foam is very easily stretched and if it is adhered to the fabric in a stretched condition it will cause subsequent puckering of the laminate due to elastic recovery.

The adhesively adhered foam and fabric laminate 17 extend about the drying cylinder 26 with the fabric 11 in contact with the cylinder surface in the manner illustrated in FIGURE 2. The drying roll 26 is maintained at a surface temperature of approximately 250° F. for the purpose of evaporating substantially all moisture from the adhesive 12 before the laminate 17 passes to a curing cylinder or roll 31 where the final curing takes place.

The adhesive is still in a plastic or fluid state while the laminate is on the drying cylinder 26 and it is important that there be no relative movement between the foam and fabric so as to prevent puckering or wrinkling and possible subsequent delamination. It is also important, as previously noted, to avoid undue pressure on the laminate while the adhesive is in the wet state.

In order to achieve these results, a blanket 27 also extends about the major portion of the drying cylinder 26 in superposed relation to the laminate 17, as further illustrated in FIGURE 2. The blanket 27 maintains the integrity of the foam fabric laminate in that it causes it to pass around the roll 26 as an integral unit without relative movement between its component parts. The blanket exerts a light pressure on the laminate in a range of a fraction of an ounce to six ounces per square inch and more preferably in a range of about ¾ of an ounce to two ounces per square inch and is driven in precise correlation to the surface speed of the drying cylinder 26 as by a driving cylinder or roll 28 and any suitable variable speed drive arrangement, not shown. The blanket 27 also passes over a vertically adjustable tension roll 29 by means of which pressure of the blanket on the laminate may be varied as needed to accommodate varying thicknesses of laminates and keep their component parts in snug engagement throughout the drying step.

The drive roll 28 drives the blanket 27 at exactly the same speed as the surface speed of the drying cylinder 26 to insure that there will be no slippage of the blanket 27 relative to the drying roll 26 and consequently no slippage or relative movement of the foam and fabric components of the laminate 17. Any suitable means to prevent slippage of the blanket 27 on the drive roll 28 may be provided, such as by wrapping the drive roll 28 to provide a non-slip surface in contact with the blanket.

The laminate 17 passes from the drying cylinder 26 to the curing cylinder 31 in such manner that the fabric 11 is again presented to the surface of the cylinder. The length of time a given portion of the laminate 17 remains in contact with the curing roll 31 is, of course, determined by the speed of the machine, and the curing temperature or surface temperature of the curing cylinder is varied depending on the type of fabric being laminated.

In this connection, it should be noted that heat transfer from the surface of the cylinders 26 and 31 to the adhesive will vary with fabric bulk and type. For example, with equivalent speed and cylinder surface temperature, the adhesive will not reach as high a temperature in a given length of time in the case of a heavy wool fabric as it will in the case of a lighter weight cotton fabric. Temperatures and length of curing time which have been found satisfactory for foam fabric laminates with various fabric components are set forth below:

| Fabric | Time (sec.) | Surface temperature of curing cylinder (° F.) | Adhesive |
| --- | --- | --- | --- |
| Cotton and Viscose Rayon (up to 9 ozs. per square yard). | 20 | 400–425 | Examples I, II or III. |
| Nylon, Dacron, Orlon, Dynel, acetate (up to 8 ozs. per square yard). | 40 | 300–325 | Examples II or III. |
| Wool and silk (up to 10 ozs. per square yard). | 40 | 375–400 | Do. |

The foregoing table is intended for illustrative purposes only, and in practicing the invention, actual tests on each weight and type of fabric should be run to insure that curing conditions are such as to produce adequate fastness to laundering and dry cleaning.

The laminate 17 passes from the curing roll 31 to a trimming station schematically illustrated at 32 and where the longitudinal edges of the foam 10 and fabric 11 are alined as desired. The laminate 17 is delivered from the trimming station 32 through nip rolls 33 to a screy 34 where cooling of the laminate to room temperature occurs before the laminate is delivered over suitable guide rolls 35, 36, 37 and 38 to a take-up roll 40.

There is thus provided a foam fabric laminate adhered by an independent adhesive which is suitable for garments and capable of economical manufacture, and wherein said independent adhesive is applied in a thin intermittent layer to the edges of the interstices of the cellular foam and porous fabric under more closely controlled conditions than is possible with the approximately ¹⁄₆₄ of an inch of foam fused to adhere itself to the fabric in the prior art.

In the drawings and specification there has been set forth a preferred embodiment of the invention and, although specific terms are employed, they are used in a generic and descriptive sense only and not for purposes of limitation, the scope of the invention being defined in the claims.

We claim:

1. A method of adhering a continuous web of polyurethane foam to a continuous web of porous fabric to form a flexible laminate having a soft hand and breathing and insulating properties and being resistant to washing and dry cleaning solutions thereby rendering the laminate suitable for garments, said method comprising the steps of passing the fabric web past an adhesive applying station while depositing a thin intermittent layer of highly viscous adhesive to one surface thereof, directing the fabric web with the adhesive thereon to a point spaced therefrom while permitting a thin tacky film to form on the surface of the adhesive, then directing the foam web into engagement with the tacky film on the surface of the adhesive free from externally applied pressure to provide a laminate of contiguous layers of fabric and foam, passing the laminate into engagement with a rotating member with the fabric layer thereof engaging the periphery of the member and in a path of travel around a major portion thereof while applying a light substantially uniform and continuous pressure of between a fraction of an ounce to six (6) ounces per square inch to the foam layer inwardly toward the member throughout the path of travel of the laminate around the member to prevent relative movement between the fabric and foam layers thereof while drying the adhesive and adhering the foam and fabric layers together, and thereafter subjecting the laminate to sufficient heat to cure the adhesive.

2. A method of adhering a continuous web of polyurethane foam to a continuous web of porous fabric to form a flexible laminate having a soft hand and breathing and insulating properties and being resistant to washing and dry cleaning solutions thereby rendering the laminate suitable for garments, said method comprising the steps of passing the fabric web past an adhesive applying station while depositing a thin intermittent layer of highly viscous adhesive to one surface thereof, directing the fabric with the adhesive thereon to a point spaced therefrom while permitting a thin tacky film to form on the surface of the adhesive, then directing the foam web into engagement with the tacky film on the surface of the adhesive free from externally applied pressure to provide a laminate of contiguous layers of fabric and foam, passing the laminate around a major portion of the periphery of a rotating member with the fabric layer thereof engaging the periphery of the member while applying a light, substantially uniform and continuous pressure of from ¾ of an ounce to two (2) ounces per square inch to the foam layer thereof inwardly toward the member throughout the path of travel of the laminate around the member to prevent relative movement between the fabric and foam layers thereof while drying the adhesive and adhering the foam and fabric layers together, thereafter subjecting the laminate to heat of between 300° to 425° F. to cure the adhesive, and thereafter trimming the edges of the foam layer into substantial alinement with the edges of the fabric layer.

References Cited

UNITED STATES PATENTS 2,921,457  1/1960  Evans _____ 66—176

FOREIGN PATENTS 761,429  1/1934  France.
821,537  10/1959  Great Britain.

OTHER REFERENCES

Delmonte, "The Technology of Adhesives" (1947), Hafner Pub. Co. (New York), p. 336.

ROBERT F. BURNETT, Primary Examiner
W. J. VAN BALEN, Assistant Examiner

U.S. Cl. X.R.

156—324, 332; 161—89, 148, 159